J. F. Mason,
Scrubbing Brush and Mop.
No. 84,129.        Patented Nov. 17, 1868.
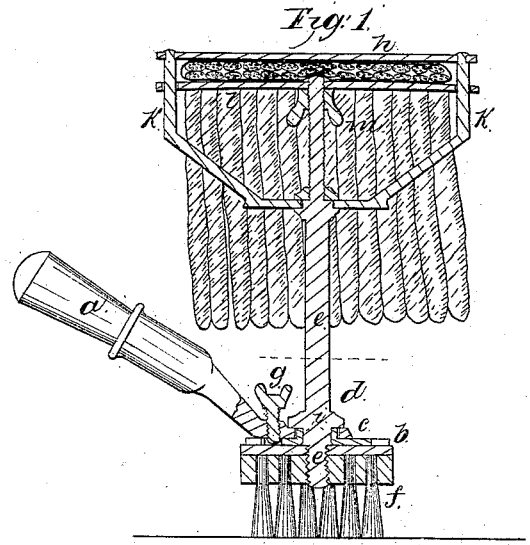
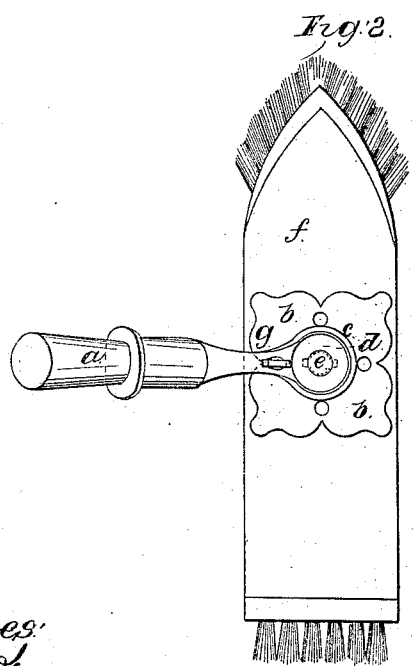
Witnesses:
Geo. D. Walsh
Chas. H. Smith
Inventor
J. F. Mason
per L. W. Serrell
Atty.

United States Patent Office.

JABEZ F. MASON, OF BROOKLYN, NEW YORK.

Letters Patent No. 84,129, dated November 17, 1868. 

IMPROVED SCRUBBING-BRUSH AND MOP.

The Schedule referred to in these Letters Patent and making part of the same.

*To all whom it may concern:*

Be it known that I, JABEZ F. MASON, of Brooklyn, in the county of Kings, and State of New York, have invented, made, and applied to use, a certain new and useful Improvement in Scrubbing-Brushes and Mops; and I do hereby declare the following to be a full, clear, and exact description of the said invention, reference being had to the annexed drawing, making part of this specification, wherein—

Figure 1 is a section of the mop, its frame, and the scrubbing-brush and handle.

Figure 2 is a section of the mop-frame, and plan of the back of the scrubbing-brush.

Similar marks of reference denote the same parts.

Scrubbing-brushes have heretofore been made with handles attached in a fixed position, but these do not furnish the facility for using the brush in any angular position to the handle, as is often required for convenience in scrubbing.

The nature of my said invention consists of a handle-attachment for a scrubbing-brush, by means of which the handle can be turned into any desired angular position to the brush, to facilitate the manipulation of said brush; and combined therewith, I employ a mop-frame, for receiving a mop in a convenient position for use, in connection with scrubbing and cleaning.

In the drawing, *a* is a handle, at the end of whose metal socket is a ring, *c*, that is inclined to the said handle. This ring *c* is placed over a circular flange, *i*, formed near the centre of the plate *b*, and is secured thereto by the flange *d* of the stem *e*, which stem *e* passes through the plate *b*, and lugs thereon, shown by dotted lines in fig. 2, are riveted up to secure the stem *e* and plate *b* permanently together, but at the same time the ring *c* of the handle *a* may turn upon the flange *i*.

The stem *e* terminates as a screw that is screwed into the wooden portion of the scrubbing-brush, and the plate *b* forming a large bearing-surface upon said brush, the connection of the handle *a* to the brush *f* is very firm and reliable.

Through the shank of the handle *a*, I put a thumb-screw, *g*, and provide holes in the plate *b* at the proper points for taking this thumb-screw, so that by it the handle can be clamped in place after the brush has been turned to the desired angle to the handle.

The stem *e* is extended upwards, and formed as a mop-frame, with the fixed bar *h* upon the arms *k*, and with the movable tightening-bar *l*, acted upon by the screw *m*, to confine the fibrous material forming the mop.

The convenience of this scrubbing-brush and mop-handle will be apparent, as the handle *a* is of a shape to be easily grasped, and the scrubbing-brush can be held in any position to the handle and the person's arm that may be desired in doing any given character of work.

This handle may be unscrewed from one brush, and applied to another brush of the usual character, whenever necessary.

What I claim, and desire to secure by Letters Patent, is—

1. A handle-attachment for a scrubbing-brush, formed of the ring *c*, flange *i*, stem *e*, and screw, in combination with the plate *b* and thumb-screw *g*, substantially as and for the purposes specified.

2. The mop-frame on the stem *e*, in combination with said handle-attachment for a scrubbing-brush, substantially as specified.

In witness whereof, I have hereunto set my signature, this 3d day of April, 1868.

JABEZ F. MASON.

Witnesses:
CHAS. H. SMITH,
GEO. D. WALKER.